United States Patent
Holladay (10) Patent No.: US 9,120,241 B2
(45) Date of Patent: Sep. 1, 2015

(54) PORTABLE ADJUSTABLE SAW GUIDE DEVICE FOR CUTTING A NOTCH

(76) Inventor: Will Holladay, Wasilla, AK (US)

( * ) Notice: Subject to any disclaimer, the term of this patent is extended or adjusted under 35 U.S.C. 154(b) by 99 days.

(21) Appl. No.: 13/419,183

(22) Filed: Mar. 13, 2012

(65) Prior Publication Data

US 2013/0283993 A1 Oct. 31, 2013

(51) Int. Cl.
*B27B 9/04* (2006.01)
*B23Q 9/00* (2006.01)
*B23Q 17/22* (2006.01)
*E04F 21/26* (2006.01)

(52) U.S. Cl.
CPC . *B27B 9/04* (2013.01); *B23Q 9/005* (2013.01); *B23Q 17/2233* (2013.01); *E04F 21/26* (2013.01); *Y10T 83/8889* (2015.04)

(58) Field of Classification Search
CPC ........ B27B 9/04; B23Q 9/0042; B23Q 9/005; B23Q 17/2233; B23Q 17/225; B23Q 17/2258; B23Q 17/2266; B23Q 17/2275; B27G 5/02; B43L 7/10; B43L 7/12; B43L 7/14; E04F 21/26; G01B 3/56; Y10T 83/8889
USPC ................... 83/574, 435.11, 435.12, 435.13, 83/435.14, 743–745, 821, 829, 522.17, 83/522.18; 33/423, 452, 456, 463, 466, 33/468–471, 403
See application file for complete search history.

(56) References Cited

U.S. PATENT DOCUMENTS

| | | | | | |
|---|---|---|---|---|---|
| 288,613 | A | * | 11/1883 | Bolles | 33/456 |
| 746,468 | A | * | 12/1903 | Crozier | 33/423 |
| 830,322 | A | * | 9/1906 | Hodge | 33/456 |
| 912,605 | A | * | 2/1909 | Osmonson | 33/456 |
| 1,040,239 | A | * | 10/1912 | Rarey | 33/456 |
| 1,074,969 | A | * | 10/1913 | Moore | 33/423 |
| 1,187,272 | A | * | 6/1916 | Demmrich | 33/421 |
| 1,999,105 | A | * | 4/1935 | Milla | 33/453 |
| 2,080,792 | A | * | 5/1937 | Simmons | 33/453 |
| 2,632,483 | A | * | 3/1953 | Jamack | 33/499 |
| 2,735,455 | A | * | 2/1956 | Forsberg | 83/745 |
| 3,352,016 | A | * | 11/1967 | Jablonsky | 33/423 |
| 4,494,434 | A | * | 1/1985 | Young | 83/745 |
| 5,384,967 | A | * | 1/1995 | Helmuth | 33/456 |
| 6,694,633 | B1 | * | 2/2004 | Nyquist | 33/452 |
| 7,269,909 | B1 | * | 9/2007 | Barbieri | 33/419 |
| 7,302,763 | B1 | * | 12/2007 | Matthews | 33/562 |
| 2012/0285028 | A1 | * | 11/2012 | Atwood | 33/452 |

* cited by examiner

*Primary Examiner* — Clark F Dexter
(74) *Attorney, Agent, or Firm* — Knobbe, Martens, Olson & Bear LLP (57) ABSTRACT

A saw guide device for the rapid and precise cutting of perpendicular notches in framing lumber using a portable circular saw. The device consists of an edge-of-board follower rail, a support arm, and a pivotally adjustable saw fence. Externally affixed to the saw fence are a horizontal cut locator arm and a saw stop tab. The locator arm has a cut alignment tang and a saw blade recess slot. The saw stop tab has a thumbscrew adjuster. The device is positioned by the alignment tang, which drops into a previous cut. During operation the saw foot overruns the cut locator arm and is stopped by the tab. Thumbscrew adjusters are located at each end of the follower rail to allow for variation in depth of the perpendicular notch. Various angular scales are marked on the upper surface of the follower rail to aid in saw fence setup.

20 Claims, 8 Drawing Sheets

PORTABLE ADJUSTABLE SAW GUIDE DEVICE FOR CUTTING A NOTCH

CROSS REFERENCES TO RELATED APPLICATIONS

U.S. Patent Documents

| | | | |
|---|---|---|---|
| 1,084,973 | January 1914 | Stanwood | 33/423 |
| 3,456,353 | July 1969 | Iams | 33/429 |
| 4,608,761 | September 1986 | Small | 33/471 |
| 4,843,728 | July 1989 | Francis | 33/640 |
| 5,148,730 | September 1992 | McCaw | 83/745 |
| 5,669,149 | September 1997 | Meitzler | 33/471 |
| D290092 | June 1987 | Bies | D10/65 |

BACKGROUND

Description of Prior Art

In a search of prior art, many adjustable saw guides were found that could help a carpenter in the layout and cutting of framing lumber in a cross-dimensional manner.

Iams, U.S. Pat. No. 3,456,353 (1969), uses two adjustable pins to serve as an edge-of-board follower rail, but those pins are located too close together to effectively stabilize the long ruler-like leg across the board's width when used as a saw fence.

Stanwood, U.S. Pat. No. 1,084,973 (1914), provides a more solid edge-of-board follower rail in combination with a good saw fence but it is not universally adjustable. It can only be adjusted to certain angles that correspond to predrilled holes. Bies, U.S. Pat. No. D290092 (1987), sold commercially as the Stanley Quick® Square, is a more updated version of the Stanwood design and while it eliminates the non-universality aspect, the tool's edges are too thin to properly serve as an adequate saw fence for many circular saw models.

McCaw, U.S. Pat. No. 5,148,730 (1992), has a good saw fence but has an undersized edge-of-board follower rail and therefore must be clamped to the work. This is a very slow process when a carpenter must cut a large number of identical members. Having only a single point connection for angle fixation allows the unit to be quite easily bumped out of adjustment by common jobsite use.

Small, U.S. Pat. No. 4,608,761 (1986), is similar to the previous mentioned patent in function, but does offer a long stable edge-of-board follower rail so it can be used one-handed without the need to be clamped to the work. The large angle adjustment setup requires a good amount of workspace and therefore is inefficient when used for cutting purposes in a repetitious manner.

Francis, U.S. Pat. No. 4,843,728 (1989), has a stable edge-of-board follower rail, an adjustment for different portable saw offsets, and a cut locator pointer to help position the saw fence, but is limited in angularity to 45 degree each side of perpendicular. It is also complicated to use in any form other than for simple cross-dimensional lumber cuts.

Meitzler, U.S. Pat. No. 5,669,149 (1997), sold commercially as the Swanson Framing Wizard, has a wide range of adjustability and is extremely compact but both the edge-of-board follower rail and the pivotal blade are too thin to be effective when the tool is tasked as a saw guide. Additionally, by placing the roof pitch and degree marking alignments around the small pivot point connector, true angle accuracy is difficult achieve. Furthermore, this tool with only a single point connection for angle fixation can be quite easily bumped out of adjustment by common jobsite use.

All the adjustable saw guides found and cited must be repositioned on the lumber and/or readjusted to aid in the making of a perpendicular notch-type cut. No adjustable saw guide was found that could by functionality, automatically position a preset perpendicular saw fence relative to an existing cut. No adjustable saw guide was found that could by functionality, automatically set the heel-stand distance equally on every board cut in a series, without the need to measure and mark each individually. No adjustable saw guide was found that incorporated a cutting stop to eliminate excessive over cut when making a perpendicular notch on lumber material. No saw guide was found that could by functionality, automatically transpose the common rafter heel-stand dimension correctly to a hip rafter seat-cut when using 2× material.

SUMMARY

Carpenters and specifically those doing building framing frequently use handheld saw guides as templates to facilitate rapid cross-dimensional layout and cutting of identical wood members. There is no better place to observe this procedure than in the cutting of common roof rafters fabricated from 2× material. While there is a production cutting method employing highly specialized tools to gang cut all the roof rafters to completion in a few steps, very few everyday carpenters or small builders could justify the expense of this type of equipment when used infrequently. Therefore, these folks are left with no alternative other than to cut each rafter individually, using their standard handheld electrically powered circular saw.

Even though specialized gang cutting tools are not employed in the process, the present day procedure for cutting 2× roof rafters individually does rely on various production gang style techniques to save time and increase precision. One of these borrowed techniques is to gang mark the rafter layout on all the boards in a particular series of rafters. This time saving step negates the age-old practice of using a full-length rafter template to mark each board separately. Gang marking is accomplished by placing all the rafter material for a series of identical common rafters on a pair of long, ground level, rafter racks. This material would be positioned on edge, crown down, side-by-side, with the ends aligned. After calculating the rafter's length, the carpenter would mark the head-cut, the tail-cut, and the heel-cut measurements on the topside edge of the outside board at each side of the racked lumber material, and then snap perpendicularly straight chalk-lines across the racked lumber to connect these marks. Next, the carpenter would gang cut a starter saw pass at each of these snap-lines using his circular saw. To make the head and tail starter-cuts, the carpenter would adjust his circular saw's bevel to match the pitch of the roof, and with the saw blade set to its maximum depth, make a long, rip-style saw-cut across the top surface of the racked lumber material following the appropriate snap-lines. Although the depth of these cuts will be far short of what is needed to complete them in most cases, they nonetheless provide an excellent physical locator to place the circular saw's blade when it comes time to finish off the cuts with the rafter boards laid flat.

With the head-cut and tail-cut starter passes made, the carpenter would adjust the depth of his saw blade to equal the vertical portion of the rafter birdsmouth's notch, commonly called the heel-cut, and make a saw pass across the top surface of the racked lumber material following the seat-cut snap-line. The heel-cut dimension is found by drawing out a full-scale birdsmouth notch having a 3½ inch seat-cut length and scaling the vertical leg. The saw's bevel would remain the same as was set previously and all three of the saw passes will angle the same direction.

Next in sequence, the carpenter would lay the partially cut rafter boards flat on their sides so he can finish cutting them with his saw bevel's set square (0 degrees). The head and tail cuts at each end of the board are made first, typically using a handheld adjustable saw guide or a plumb-cut template. After those cuts are made, the carpenter must draw out the horizontal portion of the birdsmouth notch, commonly called the seat-cut, on each rafter so he will have a cut-line to follow with his circular saw. To layout the seat-cut correctly, the carpenter's best option is to use a template-style marking jig that characterizes the desired birdsmouth notch. This jig must include a top edge-of-board follower rail to position the depth of the birdsmouth notch correctly relative to the top plane of the roof. Once the jig is aligned with the previously made heel-cut, the carpenter scribes the seat-cut line. After removing the marking jig the carpenter makes the seat-cut following the scribe-line to complete the rafter cutting procedure.

Accuracy for the seat-cut can be difficult to achieve by sight considering that the cut is very short in length, and the carpenter is making this cut freehand with his circular saw balanced precariously on the edge of the board. Not only does the front of the saw-foot obscure a good portion of the cut-line, but dark colored wood, especially pressure treated lumber, and shadows caused by bright sunlight, can cause the cut-line to be near invisible. All these things only serve to multiply inconsistencies in the finished birdsmouth notch. Variations in the seat-cut cause a poor transfer of roof load to the wall, make installing exposed frieze blocks difficult, create problems installing the fascia, and produce a wavy roof surface. Another common problem when making the seat-cut freehand, is over cutting the existing heel-cut. When excessive, the available tail strength is greatly reduced.

My saw guide device overcomes all these problems. With my device properly adjusted to the roof pitch, the user does not need to make the seat-cut by eye following a poorly visible line. The user does not even need to layout the birdsmouth notch on rafters that have been gang-cut with a heel-cut. The device is automatically positioned fore and aft on the board by a locator that drops into the previously made heel-cut. A constant rafter heel-stand height (the plumb measurement above the plate at the outside wall line) is maintained on all boards by simply planting the device's follower rail firmly against the top edge of the board. As the user follows the saw fence with the base of his saw, the cutting action is halted by a preset stop preventing excess over cut. After finishing the seat-cut, the user simply lifts the saw guide device off the rafter and moves on to cut the next board in sequence. A relatively small space between the boards is all that is required to apply the tool. My device, when used to cut hip and valley seat-cuts on 2× material, will automatically transfer over the corresponding common rafter heel-stand height correctly. The device can also be used to assist in the cutting of stair-step notches on stair stringers in the same manner as used to cut rafter birdsmouth notches.

DESCRIPTION OF THE PREFERRED EMBODIMENTS

The saw guide device comprises an edge-of-board follower rail 10 formed of aluminum or other suitable material having a horizontal top surface containing a longitudinal screw slot 101 on the outside lip 102 and a vertical fin 103 below, a support arm 12 attached to follower 10 commonly by welding or mechanical fasteners, a pivot fastener 14 positioned near the unsupported end of support arm 12, a pivotally adjustable saw fence 16 formed of aluminum or other suitable material having a horizontal base 160 containing a long longitudinal screw slot 161 attached to support arm 12 by pivot fastener 14, a thumbscrew fastener assembly 18 interconnecting the longitudinal slotted base 160 of saw fence 16 with the longitudinal slotted lip 102 on follower rail 10, a horizontal cut locator arm 20 formed of thin spring steel or other suitable material attached perpendicular to saw fence 16 commonly by welding, a downwardly directed vertical cut alignment tang 22 formed as part of locator arm 20, a saw blade recess slot 24 formed as part of locator arm 20, a saw stop tab 26 attached to saw fence 16 by welding or mechanical fasteners, a locking nut assembly 28 attached to stop tab 26, a saw over-cut adjustment thumbscrew 30 having a flat washer-style tip 301 and passing through locking nut assembly 28, two locking nut assemblies 32 and 34 attached to the vertical fin 103 of follower rail 10, two depth-of-cut adjustment thumbscrews 36 and 38 having flat washer-style tips 361, 381 and passing through locking nut assemblies 32 and 34, a graduated roof pitch scale 40 marked on the top surface of follower rail 10, two measuring scales 42 and 44 marked on the underside of follower rail 10 adjacent with the locations of thumbscrews 36 and 38, a hip/valley seat-cut conversion chart 46 located on the upper surface of support arm 12, an optional cross-dimensional saw fence 48 (FIG. 8) attached to the end of saw fence 16 commonly by welding or mechanical fasteners.

Figure 7:
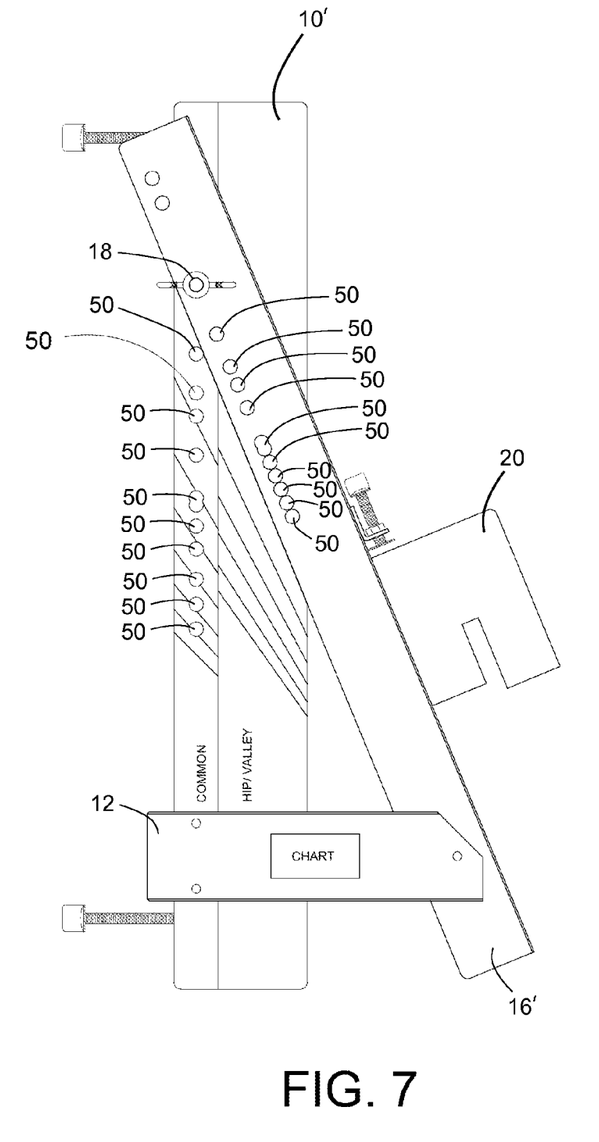
FIG. 7. Plan view of the saw guide device with optional adjustment method.

As shown in FIG. 7, in lieu of the longitudinal screw slots 101, 161 located on follower rail 10 and saw fence 16, a series of precision-drilled holes 50 or a combination of various slots and holes may be substituted as shown for follower rail 10' and saw fence 16' to mark the locations of the common roof pitches.

Operation of the Saw Guide Device

The saw guide device when used to make seat-cuts would be placed into service at that point in the previously described roof rafter cutting procedure, where the carpenter is making the finishing cuts to the rafter boards that have been laid flat on the racks. The head and tail cuts at each end of the boards B would have already been completed and only the seat-cut remains to be made. To be able to use the device, the boards B will need to be oriented so that the tops of the rafters B are on the left side when viewed from the head-cut end, and the saw guide device must be adjusted to the pitch of the roof. Adjusting the saw guide device is done by loosening thumbscrew adjuster 18, pivoting saw fence 16 to align with the desired roof pitch marking as shown on scale 40, and then retightening thumbscrew 18.

Figure 1:
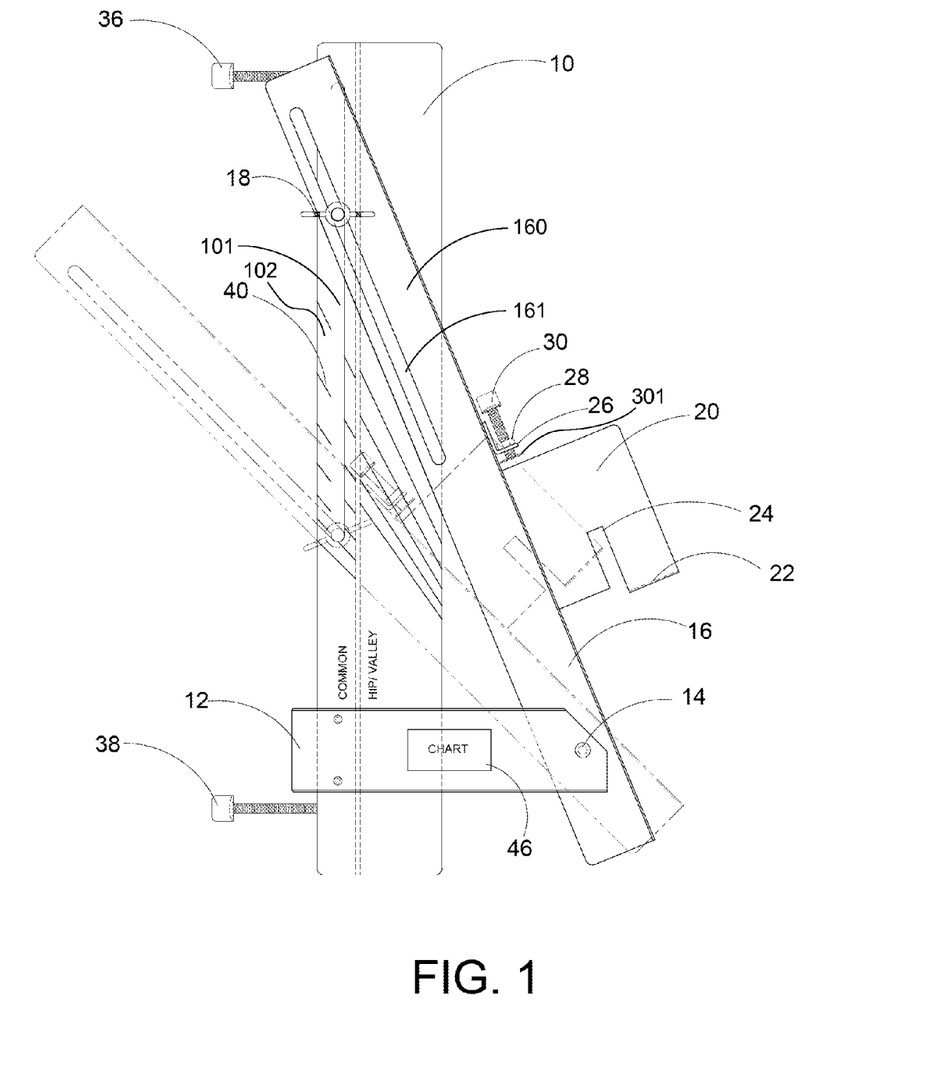
FIG. 1. Plan view of the saw guide device.
Figure 2:
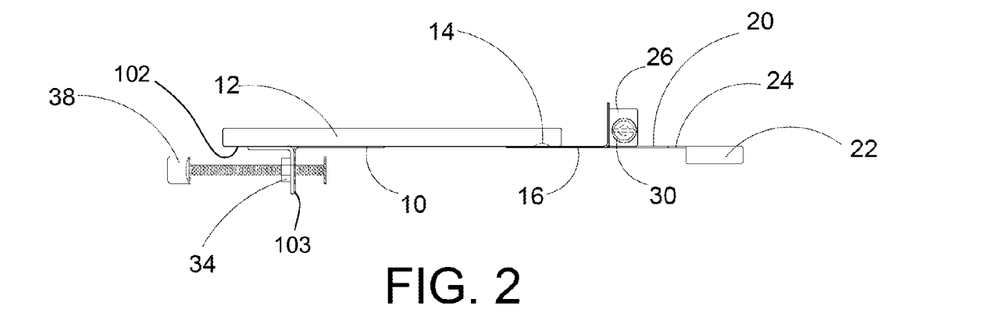
FIG. 2. Side view of the saw guide device as viewed from the support arm end.
Figure 3:
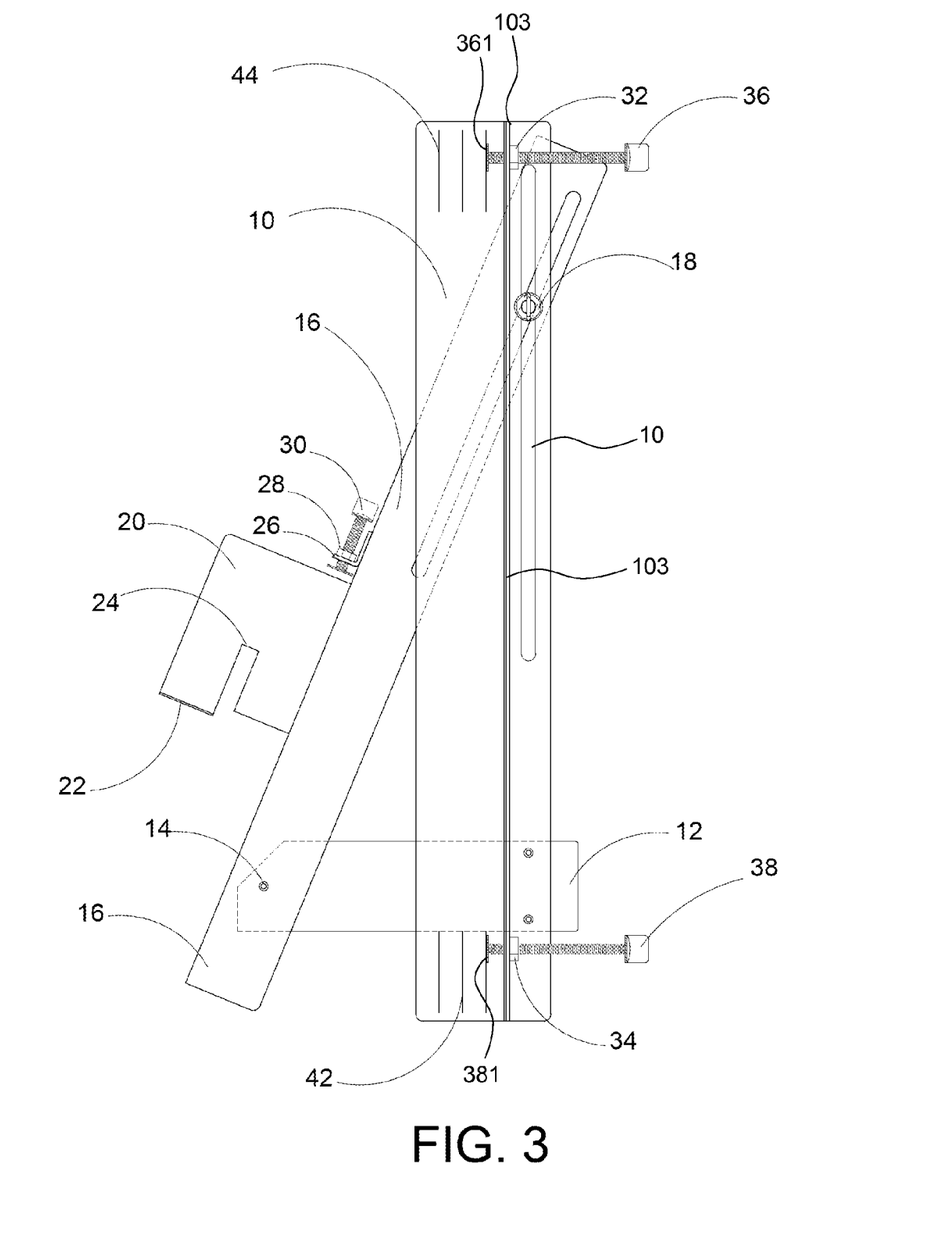
FIG. 3. Bottom view of the saw guide device.
Figure 4:
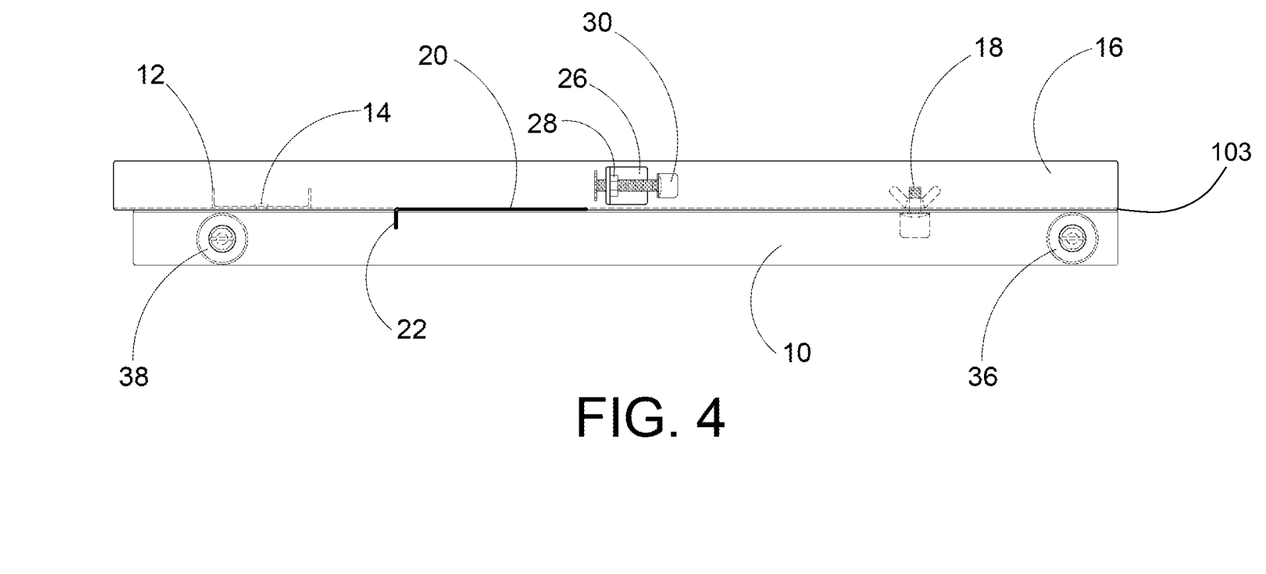
FIG. 4. Front view of the saw guide device.
Figure 5:
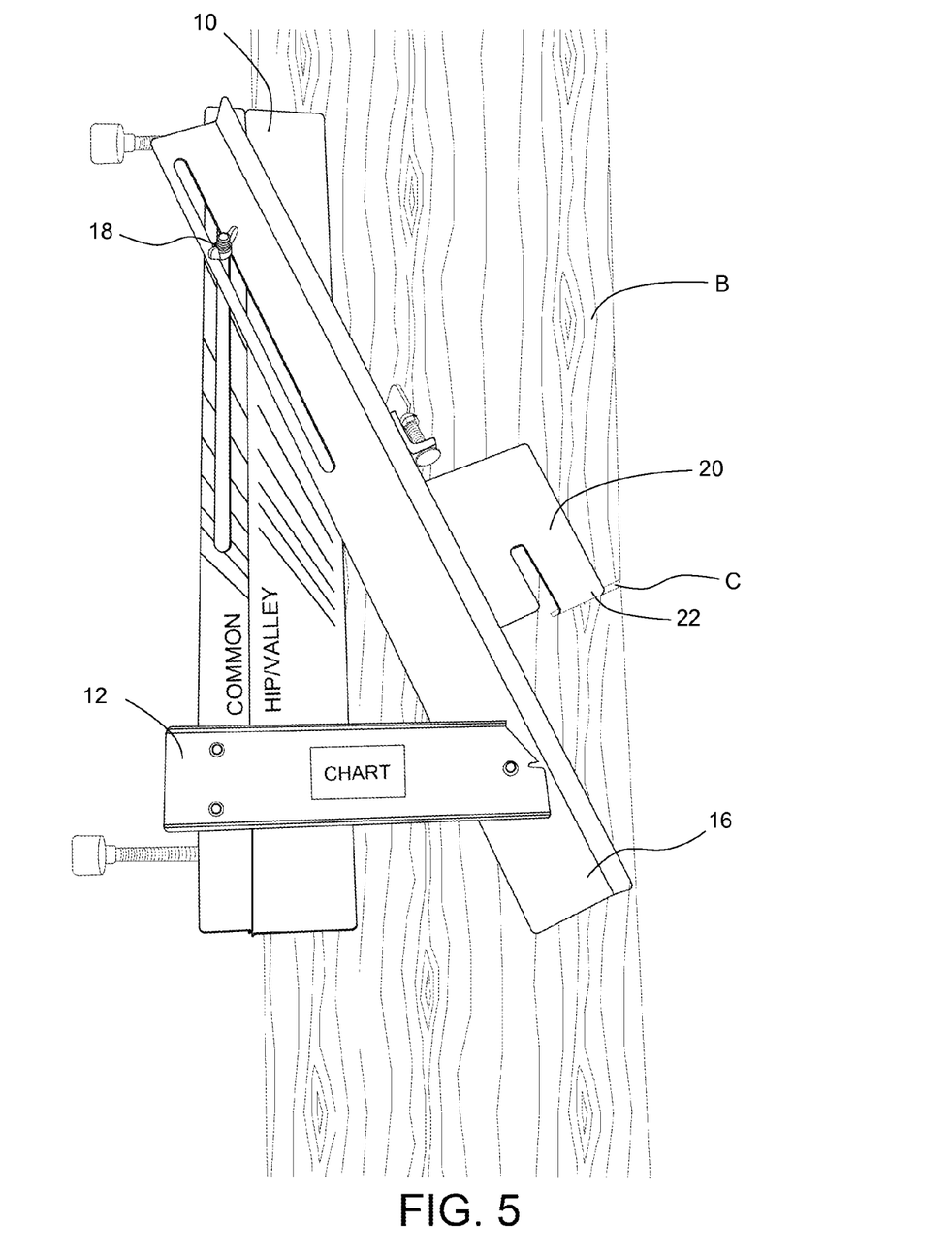
FIG. 5. Perspective view of the saw guide device positioned for use.
Figure 6:
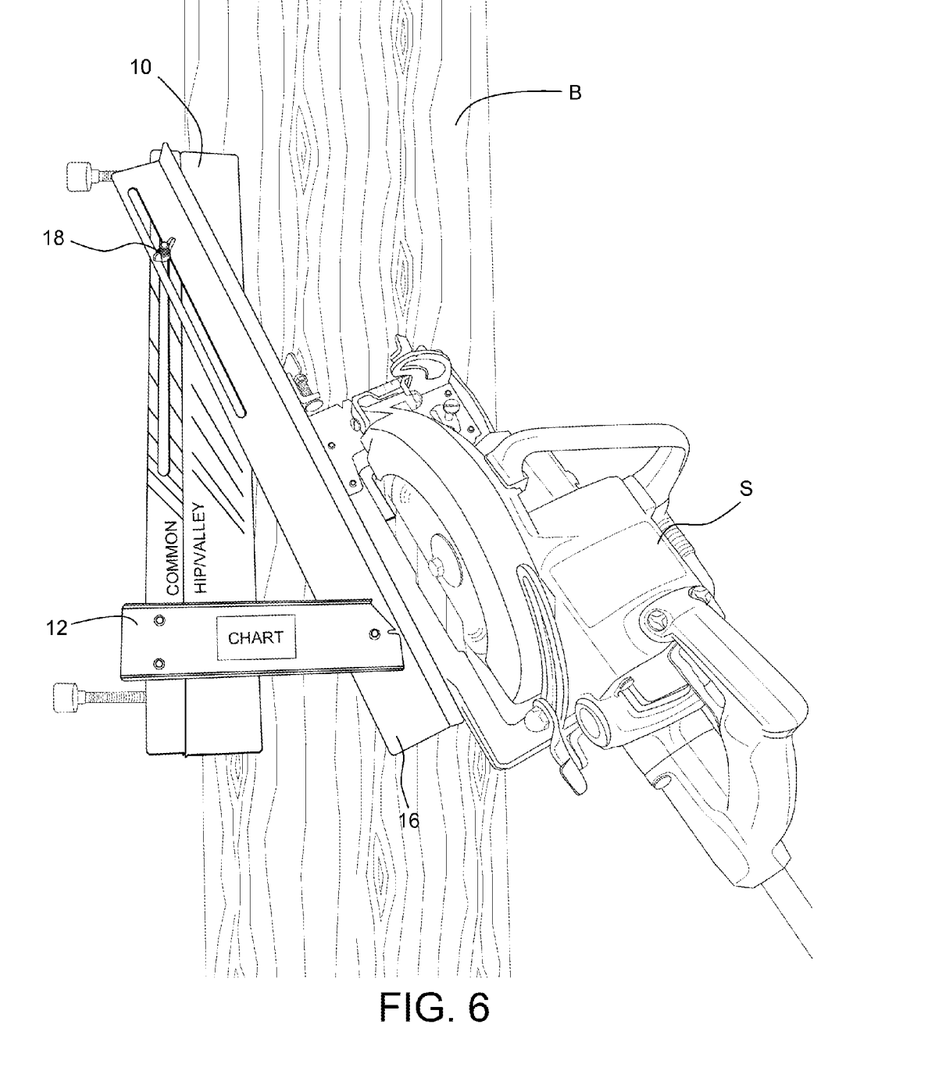
FIG. 6. Perspective view of the saw guide device in application with a circular saw.

Next, place the saw guide device on one of the rafter boards B to be cut so follower rail 10 is running along the top edge of the rafter B and slide it as needed until alignment tang 22 drops into the previously made heel-cut C. Then, place the left front of a foot of a circular saw S against saw fence 16 with the blade just short of touching the wood. Keeping the saw S tight to the top edge of the board B with the left hand, activate the saw's motor with the right hand and push the circular saw S along saw fence 16. As the cut nears completion, the saw foot will ride over locator arm 20 and the saw blade will enter recess slot 24. Forward progress is halted by over-cut adjustment thumbscrew 30. Deactivate the saw's motor at that point. The wedge of material from the birdsmouth notch will fall to the ground. After removing the circular saw S, lift the saw guide device from the notch and move on to cut the next rafter B.

If this is the first time using the saw guide device, inspect the notch to verify that the over-cut adjuster thumbscrew 30 is set correctly. Readjust if required. Once this adjuster 30 has been set for a particular saw, it seldom needs readjustment unless a different circular saw model is used. Best performance is achieved with the saw guide device when the circular saw's blade depth is set to its maximum.

To make the corresponding seat-cuts on 2× hip and valley rafters, adjust saw fence 16 to align with the desired roof pitch marking shown for hip/valley rafters on scale 40, and dial in thumbscrews 36 and 38 equally, to the amount shown on the hip/valley conversion chart 46 for the appropriate roof pitch. After the hip or valley rafter heel-cut has been made, the saw guide device is placed in position on the board B as was done with the common rafters and the seat-cut is made.

Figure 8:
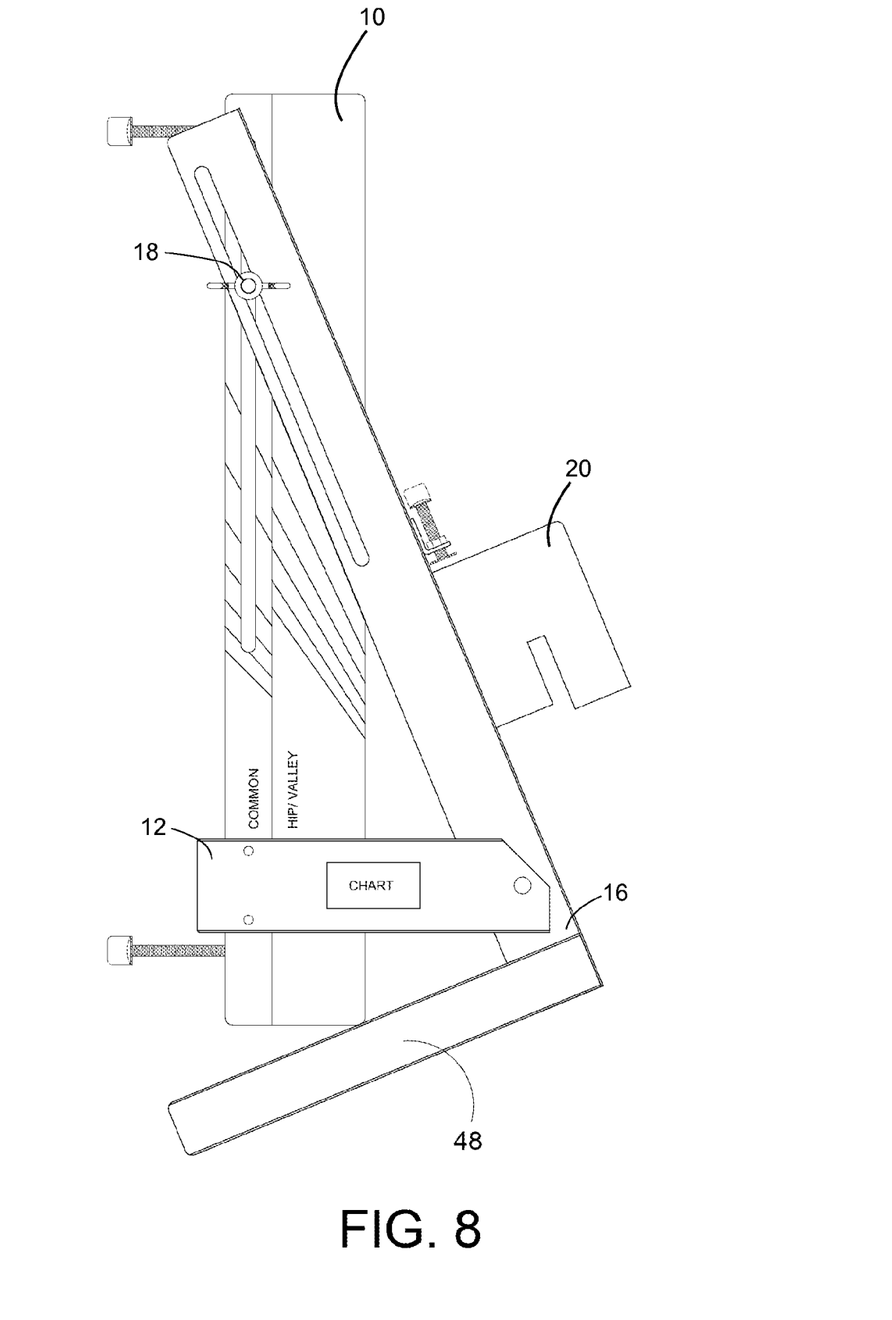
FIG. 8. Plan view of the saw guide device with optional cross-dimension saw fence installed.

While the primary usage of the saw guide device in this example has been to make birdsmouth seat-cuts, it could also be employed as a regular cross-dimensional saw guide to make the head and tail cuts at each end of the rafter boards B when equipped with optional fence 48 (FIG. 8).

The saw guide device is fabricated with a 1½ inch outside edge of saw foot to blade setback, which is the standard blade setback for a right-handed, heavy-duty, 7¼ worm-drive circular saw. Likewise, the over-cut adjuster thumbscrew 30 distance is variably adjusted within the range of these same saw's physical characteristics. Because the worm-drive circular saw with a left-side mounted blade is the most popular framing saw, it was used in the design orientation of my saw guide device. This does not mean to say that my saw guide device is limited to this type of circular saw alone, but rather to say that the saw guide device will operate with any type of circular saw whether the blade is positioned on the left or right if this is taken into account when fabricated. A saw guide device constructed for a circular saw with a right-side mounted cutting blade would be the mirror image of the unit illustrated in the Figures and it would be applied to the reverse side of the board B from what is shown.

Saw fence 16 has a pivotal range from roof pitch 3/12 through 12/12 (14 degrees through 45 degrees), relative to a top edge of the board B. The saw guide device is geometrically designed so that, whatever common rafter roof pitch is selected on scale 40, the resulting seat-cut will be approximately 3½ inches long. This length was found to be the most prevalent seat-cut size designated by architects on building prints. The birdsmouth notch size can be enlarged if desired by dialing in thumbscrews 36 and 38 equally, using scales 42 and 44 as a guide to keep the saw guide device properly aligned.

The saw guide device is designed to be used most effectively within two adjacent lumber sizes. As an example, consider a device fabricated to serve both 2×8 and 2×6 lumber material, which are the most commonly used rafter stock. For 2×8 sized boards, thumbscrews 36 and 38 would be threaded all the way out, while for 2×6 sized boards, thumbscrews 36 and 38 would dialed in equally to a measurement of 2 inches. The device is certainly not limited to only two adjacent sizes of lumber material, but rather, the device becomes somewhat cumbersome when three or four different sizes of material are included in its range of adjustability.

Cut locator arm 20 is fabricated from thin spring steel or some other material with similar spring-like quality that would permit alignment tang 22 to flex upward and not interfere when the optional cross-dimensional saw fence 48 is applied.

The saw guide device can be used to make perpendicular notches in other similar situations including stair stringers when applied in a like manner. Those skilled in the art of carpentry will realize that variations to the invention can be made without departing from the scope of this invention.

I claim:

1. A portable circular saw guide device for the precise locating and cutting of perpendicular notches in common lumber material, the guide device comprising:
    a follower rail to rest upon the edge of the board during application of a cutting tool, said follower rail having a longitudinal adjustment slot and having a support arm attached thereto, the support arm fixed at 90 degrees to the follower rail;
    a saw fence having a longitudinal adjustment slot, said saw fence having one end pivotally connected to an unattached end of the support arm by a pivot fastener;
    a mechanical fastener interconnecting the longitudinal slot of said follower rail to the longitudinal slot of said saw fence, said mechanical fastener allowing said saw fence to be angularly adjustable from 14 degrees through 45 degrees relative to a longitudinal edge of the follower rail while the support arm is fixed at 90 degrees to the follower rail, wherein the follower rail, the support arm and the saw fence are connected together so as to form an internal area therebetween;
    a horizontal cut locator arm attached to and disposed externally of said saw fence, the locator arm having an alignment tang and a saw blade recess slot;
    a saw stop tab attached to and disposed externally of said saw fence, the stop tab having an adjustment thumb screw; and
    two thumbscrew adjusters located on a vertical fin of said follower rail.

2. The saw guide device of claim 1 further comprising a cross dimensional fence attached at a right angle to said one end of said saw fence that is pivotally connected to the support arm.

3. A portable saw guide device for cutting perpendicular notches in a wood board, comprising:
    a follower rail configured to rest upon the edge of the wood board and having a longitudinal adjustment slot and having a support arm attached thereto, wherein the support arm is fixed at 90 degrees relative to the follower rail;
    a saw fence having a longitudinal adjustment slot and one end pivotally connected to an unattached end of the support arm;
    a fastener interconnecting the longitudinal adjustment slot on said follower rail to the longitudinal adjustment slot on said saw fence, said fastener allowing said saw fence to be angularly adjustable from about 14 degrees through about 45 degrees relative to a longitudinal edge of the follower rail while the support arm is fixed at 90 degrees to the follower rail, wherein the follower rail, the support arm and the saw fence are connected together so as to form an internal area therebetween;

a horizontal cut locator arm attached to and disposed externally of said saw fence, the locator arm having an alignment tang and a saw blade recess slot; and a saw stop tab attached to and disposed externally of said saw fence.

4. The device of claim 3, further comprising adjusters located on a vertical fin of said follower rail.

5. The device of claim 4, wherein the adjusters are a pair of thumbscrews.

6. The device of claim 3, wherein the saw fence is pivotally connected to the support arm through a pivot fastener.

7. The device of claim 3, wherein the follower rail is formed from aluminum.

8. The device of claim 3, wherein the follower rail is attached to the support arm by a weld or mechanical fastener.

9. The device of claim 3, wherein the horizontal cut locator arm is formed from spring steel.

10. The device of claim 3, wherein the alignment tang comprises a vertical cut alignment tang.

11. The device of claim 3, further comprising measuring scales marked on the follower rail.

12. The device of claim 3, further comprising a seat-cut conversion chart located on the support arm.

13. The device of claim 3, further comprising a cross dimensional fence attached at a right angle to a lower end of the saw fence.

14. A portable saw guide device for cutting perpendicular notches in a wood board, comprising:

a follower rail configured to rest upon an edge of the wood board, and a support arm fixed to the follower rail and extending at 90 degrees relative to the follower rail;

a saw fence having one end pivotally connected to an unattached end of the support arm;

a fastener interconnecting the follower rail to the saw fence through a longitudinal slot or series of holes in the follower rail and in the saw fence, said fastener allowing said saw fence to be angularly adjustable from about 14 degrees through about 45 degrees relative to a longitudinal edge of the follower rail while the support arm is fixed at 90 degrees to the follower rail, wherein the follower rail, the support arm and the saw fence are connected together so as to form an internal area therebetween;

a horizontal cut locator arm attached to and disposed externally of said saw fence, the locator arm having an alignment tang and a saw blade recess slot; and a saw stop tab attached to and disposed externally of said saw fence.

15. The device of claim 14, wherein the fastener connects the follower rail to the saw fence through the series of holes.

16. The device of claim 14, wherein the fastener connects the follower rail to the saw fence through the longitudinal slot.

17. The device of claim 14, further comprising a cross dimensional fence attached at a right angle to said one end of the saw fence that is pivotally connected to the support arm.

18. The device of claim 14, further comprising measuring scales marked on the follower rail.

19. The device of claim 14, further comprising a seat-cut conversion chart located on the support arm.

20. The device of claim 14, wherein the saw blade recess slot is configured to prevent movement of a saw in a direction from the support arm towards the follower rail.

* * * * *